United States Patent [19]
Pounder et al.

[11] Patent Number: 6,012,340
[45] Date of Patent: Jan. 11, 2000

[54] INSERTION-TYPE FLUID FLOWMETER

[75] Inventors: Edwin Pounder, La Canada; Gert Burkhardt, Pasadena, both of Calif.

[73] Assignee: Signet Scientific Company, El Monte, Calif.

[21] Appl. No.: 09/047,817

[22] Filed: Mar. 25, 1998

[51] Int. Cl.$^7$ .................................................. G01F 15/00
[52] U.S. Cl. .................................... 73/861.77; 73/861.92
[58] Field of Search ........................... 73/861.77, 861.78, 73/861.92, 861.79, 861.83

[56] References Cited

U.S. PATENT DOCUMENTS

| | | | |
|---|---|---|---|
| 3,630,078 | 12/1971 | Bonnet ................................. | 73/152.35 |
| 3,771,363 | 11/1973 | Stapler ................................. | 73/861.92 |
| 3,911,743 | 10/1975 | Nicolas et al. ....................... | 73/861.92 |
| 3,934,467 | 1/1976 | Nicolas ................................. | 73/152.34 |
| 4,114,440 | 9/1978 | Stapler ................................. | 73/861.92 |
| 4,241,605 | 12/1980 | Hendriks et al. .................... | 73/861.94 |
| 4,399,696 | 8/1983 | Feller .................................... | 73/195 |
| 4,674,338 | 6/1987 | Carpenter ............................. | 73/861.77 |
| 4,856,348 | 8/1989 | Hall ...................................... | 73/861.78 |

OTHER PUBLICATIONS

"Basic Specifications for McCrometer Propeller Flowmeters," McCrometer Product Data, Bulletin GI200, 1993 by Ketema, Inc.

"Bolt–On Saddle Flowmeter, Model MO300," McCrometer Product Data, Bulletin MO300, 1991 by Ketema, Inc.

*Primary Examiner*—Harshad Patel
*Attorney, Agent, or Firm*—Sheppard, Mullin, Richter & Hampton LLP; James R. Brueggemann

[57] ABSTRACT

The present invention provides an improved insertion-type fluid flowmeter for measuring the flow rate of a fluid flowing through a conduit, wherein the flowmeter incorporates a strut-mounted rotor having just one or two blades such that it can rotate through a circular area of diameter substantially larger than the maximum dimension of an opening in the conduit wall through which the strut extends. This minimizes the size of the opening, which simplifies its sealing. In addition, the support and the strut are configured such that the strut is releasably secured to the support by a snap fit, to facilitate a convenient replacement of the strut and attached rotor as the need might arise. The flowmeter further incorporates a special set of ring-shaped spacers, to facilitate a convenient adjustment of the distance by which the strut projects into the conduit.

15 Claims, 3 Drawing Sheets

INSERTION-TYPE FLUID FLOWMETER

BACKGROUND OF THE INVENTION

This invention relates generally to fluid flowmeters and, more particularly, to insertion-type fluid flowmeters that can be extended through the wall of a conduit and that include a rotor configured to rotate at a rate that varies with fluid flow rate.

Fluid flowmeters of this particular kind typically mount the rotor at the end of a strut that projects radially into the conduit, through an opening formed in the conduit wall. The rotor can take the form of a paddle wheel, rotatable about an axis transverse to the direction of fluid flow, or alternatively can take the form of a multi-bladed turbine or propeller, rotatable about an axis aligned with the direction of fluid flow. In either case, permanent magnets can be embedded within the tips of the individual paddles or blades, for sensing by a sensor located within the strut, to produce a measurement of fluid flow rate.

In the case of flowmeters incorporating propeller-type rotors, accuracy and sensitivity generally can be enhanced if the rotor is made to rotate about an axis substantially aligned with the conduit's centerline and also if the rotor's circular sweep area is made to be as large as possible. Ordinarily, this can be achieved only if the opening in the wall of the conduit is quite large, because the opening must be sized to allow insertion and removal of the strut and rotor. This can lead to difficulties in sealing the opening after the strut and rotor have been inserted.

Fluid flowmeters of this kind have utility in measuring the flow rates of both liquids and gases, and particularly liquids flowing through large pipes. Such pipes can vary in diameter to as high as 400 mm. This large size makes even more difficult the sealing problems mentioned above.

It should, therefore, be appreciated that there is a need for an improved insertion-type fluid flowmeter incorporating a rotor configured to sweep through a circular area of diameter substantially larger than the maximum dimension of the opening in the conduit. It should also be appreciated that there is a need for an improved flowmeter of this kind, configured for convenient replacement of the strut and rotor, and further configured for convenient adjustment of position of the rotor's rotation axis within the conduit. The present invention fulfills these needs and provides further related advantages.

SUMMARY OF THE INVENTION

The present invention is embodied in an improved insertion-type fluid flowmeter for measuring the flow rate of a fluid flowing through a conduit, wherein the flowmeter incorporates a strut-mounted rotor configured to rotate through a circular area of diameter substantially larger than the maximum dimension of an opening in the conduit wall through which the strut extends. More particularly, the rotor is mounted at the end of the strut, for rotation about an axis substantially aligned with the direction of fluid flow through the conduit, and the rotor is configured to rotate at a rate that varies with flow rate. A sensor senses rotation of the rotor, to produce a measurement of fluid flow rate. In one feature of the invention, the rotor includes a hub and just one blade or two blades projecting in opposite directions from the hub, with rotation of the rotor causing the blade(s) to sweep through a circular area of diameter substantially larger than the maximum dimension of the opening in the wall of the conduit.

The strut is supported in its prescribed position extending through the opening in the conduit wall by a support, and a seal is provided to prevent fluid from escaping through the opening. In a separate and independent feature of the invention, the support and the strut are configured such that the strut is releasably secured to the support, e.g., by a snap fit. This facilitates a convenient replacement of the strut and attached rotor as the need might arise.

The support also is configured to facilitate a convenient adjustment of the distance by which the strut projects into the conduit. This enables the rotor to be positioned at any desired position within the conduit, e.g., a position in which the rotor's rotation axis is substantially coincident with the conduit's central longitudinal axis. In a separate and independent feature of the invention, this adjustability is achieved by providing a set of ring-shaped spacers, a selected number of which can be positioned between a ring-shaped flange of the support and a mechanism attached to the conduit. The ring-shaped spacers can have relative heights that form a binary progression, to facilitate adjustment of the rotor's position with a minimum number of components.

In other, more detailed features of the invention, the flowmeter fitter includes a bearing assembly that couples the hub of the rotor to the strut, the bearing assembly including one or more journal bearings and a wearable face seal. The Journal bearings can be held by a bearing holder, and the hub of the rotor is secured to the bearing holder by any suitable means, e.g., by a snap fit.

Other features and advantages of the present invention should become apparent from the following description of the preferred embodiment, taken in conjunction with the accompanying drawings, which disclose, by way of example, the principles of the invention.

DESCRIPTION OF THE PREFERRED EMBODIMENT

Figure 1:
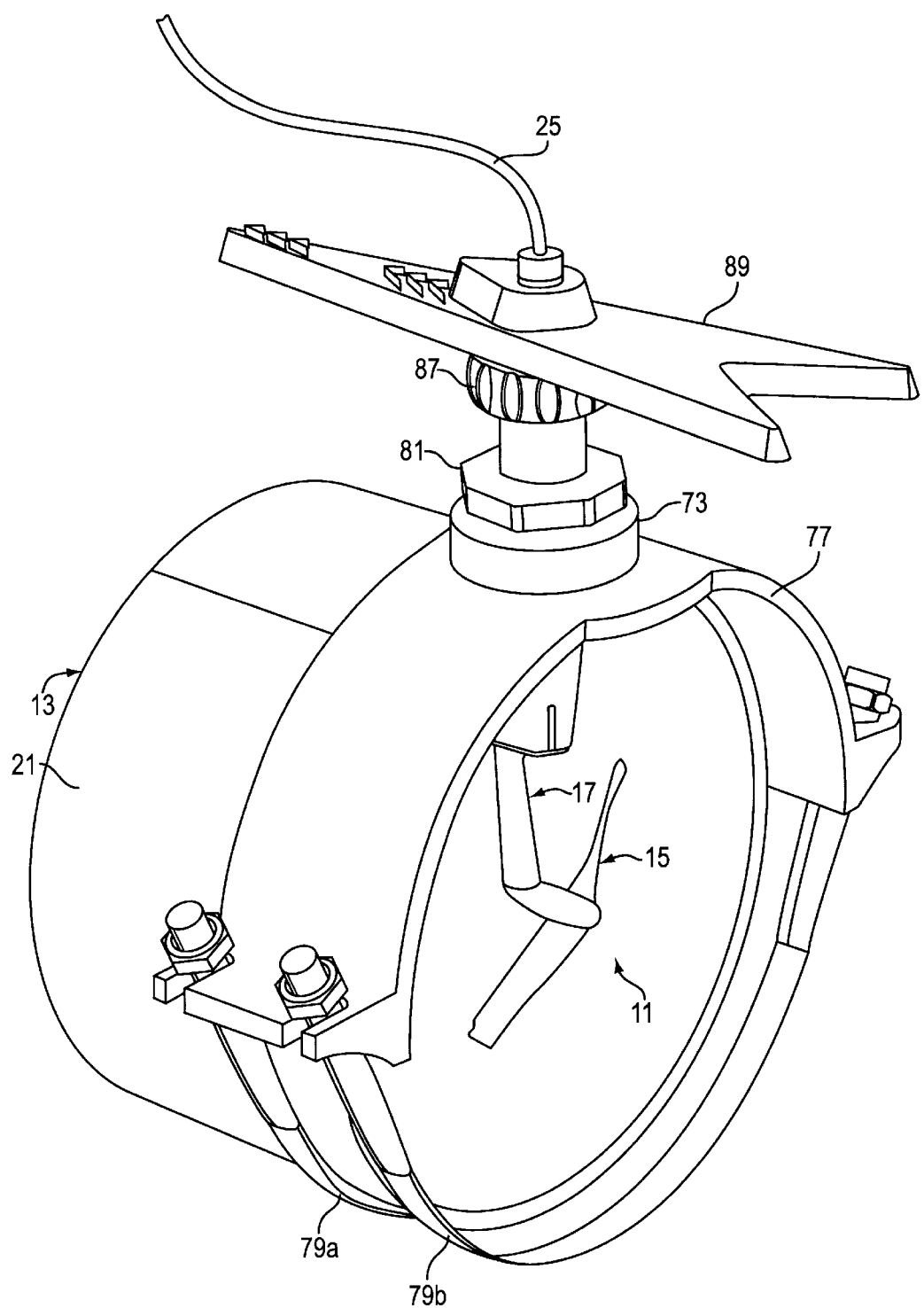
FIG. 1 is an isometric, cutaway view of an irrigation pipe to which is secured a fluid flowmeter in accordance with a preferred embodiment of the invention.
Figure 2:
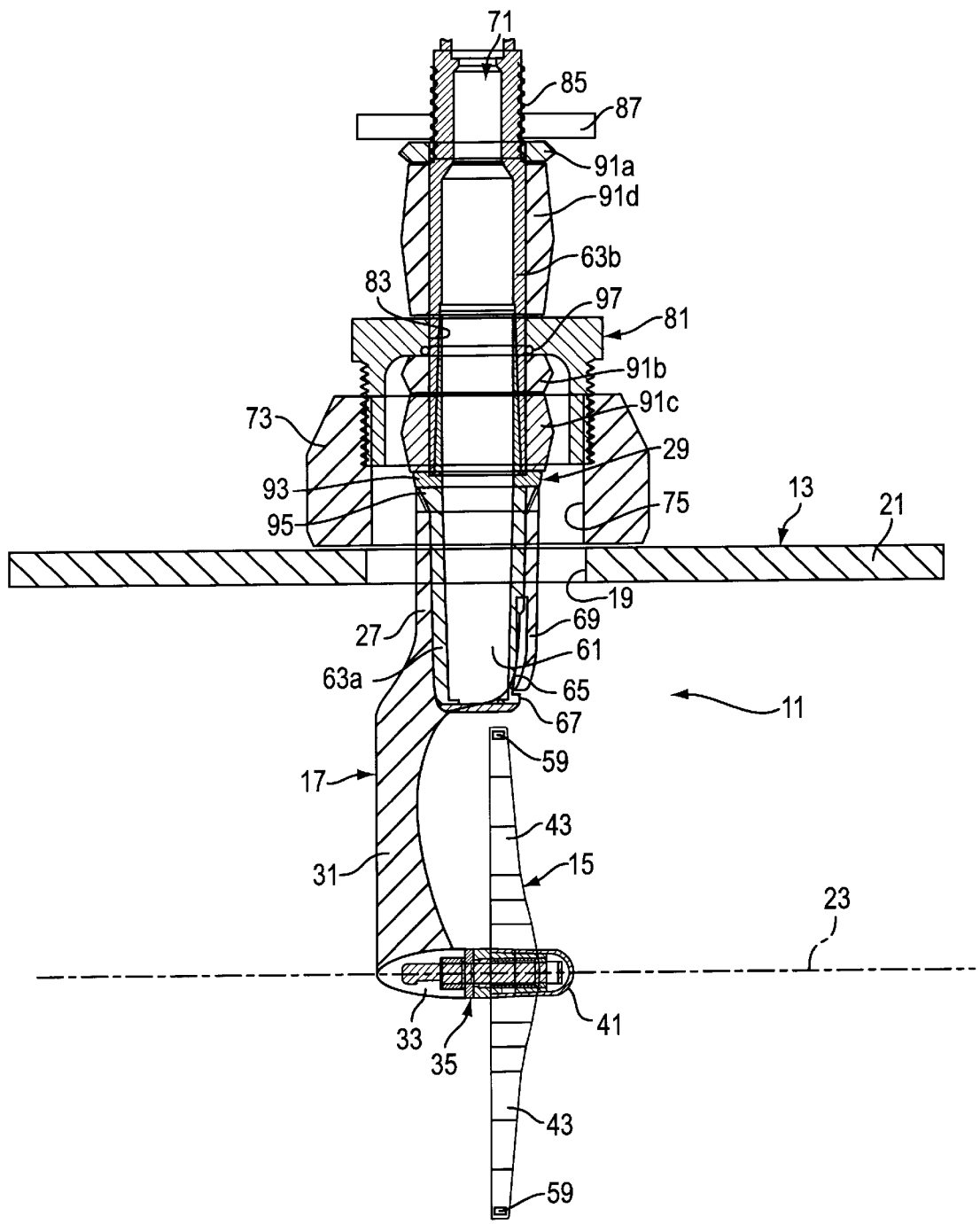
FIG. 2 is a side, partial cross-sectional view of the fluid flowmeter of FIG. 1, showing an adjustable mount for a strut that supports the rotor.

With reference now to the drawings, and particularly to FIGS. 1 and 2, there is shown an insertion-type flowmeter assembly 11 mounted to an irrigation pipe 13, for measuring the flow rate of water or other liquid flowing through the pipe. The flowmeter assembly includes a plastic rotor 15 mounted for rotation on a plastic strut 17 that extends radially into the pipe through a circular opening 19 formed in the pipe wall 21. The rotor is positioned with its axis of rotation 23 arranged generally parallel with the pipe's longitudinal axis, and the rotor is configured such that fluid flow through the pipe causes it to rotate at a rate that varies substantially directly with fluid flow rate. Electronic circuitry (not shown) senses this rotation rate and produces a corresponding electrical signal for output to a remote receiver via a cable 25.

The plastic strut 17 that carries the rotor 15 includes a hollow base end 27 mounted to a tubular support 29 that, itself, extends through the opening 19 in wall 21 of the pipe 13. A neck 31 projects from the strut's hollow base end, terminating at a cone 33, to which is attached a generally cylindrical bearing assembly 35 that projects in a direction opposite to the direction of fluid flow. This bearing assembly is configured to receive and retain the rotor. The entire strut, including the hollow base end, the neck, and the cone, are molded integrally from a suitable plastic material.

The bearing assembly incorporates four shallow projections 37 spaced around its periphery, for receiving four correspondingly sized apertures 39 in a hollow hub 41 of the rotor 15, to retain the rotor in place. Specifically, the hub is snapped onto the projections, and then heat-staked in place. The hub and cone 33 cooperate to form an hydrodynamic shape that minimizes drag. Projecting in radially opposite directions from the rotor's hub are two blades 43, which are molded integrally with the hub. The blades preferably each have a length to width ratio of at least about 4 to 1. In addition, the blades can be tapered, from a relatively wide cross-section close to the hub to a narrower cross-section at the tip.

The use of a rotor 15 incorporating just two blades minimizes the required size for the opening 19 formed in the pipe wall 21. To insert or remove the flowmeter assembly 11, the blades merely need to be rotated into alignment with the strut 17 and tubular support 29. The rotor's configuration enables the opening to be made substantially smaller than the diameter of the rotor's circular sweep.

In an alternative embodiment, not shown in the drawings, the rotor can incorporate just a single blade. This alternative embodiment achieves the same advantage of enabling the opening formed in the pipe wall to be made substantially smaller than the diameter of the rotor's circular sweep.

Figure 3:
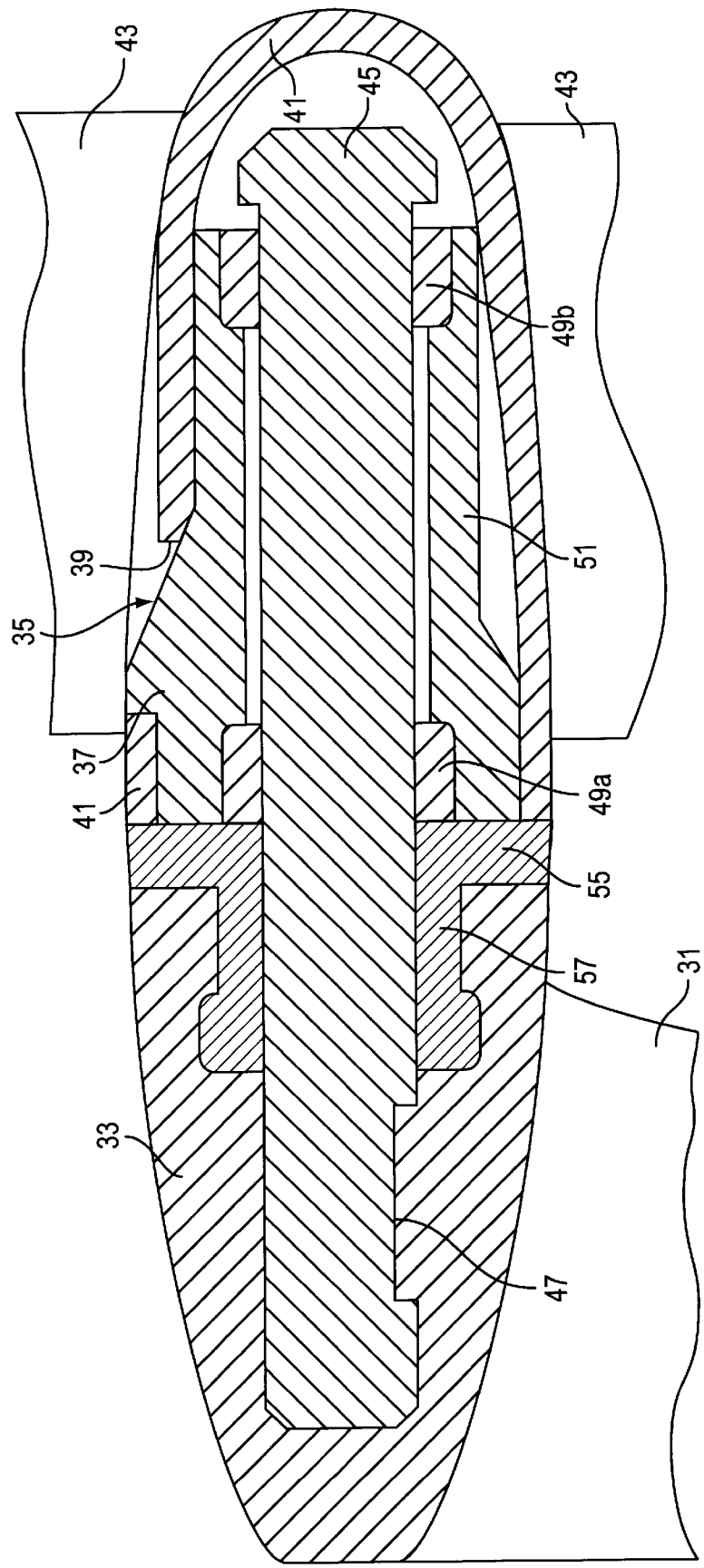
FIG. 3 is a cross-sectional view of the rotor of the fluid flowmeter of FIG. 1, showing a bearing mechanism for mounting the rotor to the strut.

With reference now to FIG. 3, the bearing assembly 35 is shown to include a ceramic, generally cylindrical shaft 45 having one end molded within the strut's plastic cone 33. A groove 47 (or other irregularity) in the shaft's molded-in portion prevents the shaft from moving relative to the cone either axially or rotationally. Alternatively, the bearing assembly can be secured by other suitable means, e.g., a set screw. Rotatably encircling the projecting portion of the shaft are two ceramic journal bearings 49a and 49b, which are carried by a plastic, generally cylindrical bearing holder 51. A knob 53 at the shaft's remote end prevents the bearing holder and bearings from sliding off the shaft.

A stainless steel washer 55 is mounted on the shaft 45, between the bearing holder 51 and the cone 33, to function as a face seal for the bearing holder when the flowmeter assembly 11 is in use within the pipe 13. This face seal, which can be sacrificial during use, inhibits the migration of sand or other liquid-carried debris from reaching the journal bearings 49a and 49b. The washer is fixed to the plastic cone 33 by an irregular projection 57 that is molded into the cone. Alternatively, the washer can be secured by other suitable means, e.g., a set screw.

With reference again to FIGS. 1 and 2, the rotor 15 and the neck 31 of the strut 17 are shown to be sized and configured such that rotation of the rotor causes the remote tips of the rotor's two blades 43 to pass close to a portion of the strut's hollow base end 27, and thus the tubular support 29 to which the hollow base end is releasably mounted. This position for the rotor blades is accommodated by recessing the neck rearwardly, as best shown in FIG. 2. Permanent magnets 59 are embedded within the outer tips of the two blades, and a magnetic sensor (not shown) located within a hollow cavity 61 of the tubular support produces a pulse signal each time a blade tip moves past it. The frequency of the pulse signal is a direct measure of the rotor's rotation rate.

The tubular support 29 that extends through the opening 19 in the wall 21 of the pipe 13 is comprised of two generally cylindrical parts, nested tightly together, including an inner part 63a and an outer part 63b. The inner part has a closed end to which the hollow base end 27 of the strut 17 is releasably mounted, and the outer part extends radially outwardly from the pipe. An outward facing conical surface of the inner part 63a nests with a complementarily sized inwardly conical surface of the outer part 63b.

The inward end of the tubular support's inner part 63a has a generally oval shape that is complemented by the shape of the hollow base end 27 of the strut 17. In addition, a shallow recess 65 and lip 67 are formed in the outer surface of the tubular support's inner part 63a, to releasably receive and retain a flexible finger 69 of the strut's base end. This allows the strut to be releasably snapped in place, and thus facilitates a convenient replacement of the strut and attached rotor 15 as the need might arise. Other releasable attachment means, e.g., a set screw, could alternatively be used. The complementary oval shapes and the locations of the recess 65 and finger 69 ensure that the strut and rotor are properly aligned with the tubular support.

Electronic circuitry (not shown) is located within the tubular support 29, for sensing rotation of the adjacent rotor 15 and producing an electrical signal representative of that rotation, and thus representative of the liquid flow rate through the pipe 13. That signal is supplied to a remote monitor (not shown) via the cable 25, which emerges through a small opening 71 formed in the outer end of the tubular support's outer part 63b. The circuitry preferably is potted with a suitable potting compound.

The flowmeter assembly 11 further is configured to secure the tubular support 29 in a selected position on the irrigation pipe 13, preferably in a position such that the rotor's axis of rotation 23 is substantially aligned with the pipe's centerline. To this end, the assembly further includes a pipe fitting 73 having a threaded opening 75 (preferably pipe threads) that overlays the opening 19 in the pipe wall 21. This pipe fitting is secured in place by a conventional half-cylindrical band 77 and a pair of releasable straps 79a and 79b. Alternatively, it can be welded in place. Threaded to this pipe fitting 73 is an externally threaded fitting 81 having a central circular opening 83 through which extends the tubular support's outer part 63b. The outer end of the tubular support's outer part is externally threaded, as indicated by the reference numeral 85, to receive a nut 87. This secures the tubular support to the threaded fitting 81, and thus to the pipe fitting 73 and the pipe 13.

A flow direction indicator 89 can be retained at the outer end of the tubular support's outer part 63b, aligned by means of keyed splines (not shown). This enables the entire flowmeter assembly 11 to be conveniently aligned relative to the pipe 13, with the rotation axis 23 of the rotor 15 aligned with the direction of liquid flow.

The precise radial position of the tubular support 29 relative to the threaded fitting 81, and thus relative to the pipe fitting 73 and the pipe 13, is controlled by a set of ring-shaped spacers 91a, 91b, 91c and 91d. These spacers are sized to slide over the cylindrical external wall of the tubular support's outer part 63b. Selected ones of the spacers are positioned between the threaded fitting 81 and an outwardly projecting flange 93 of the tubular support's inner part 63a, and the remaining spacers are positioned between the threaded fitting 81 and the nut 87. This precisely positions the tubular support relative to the pipe. A plurality of ribs 95 provide structural support for the flange 93, and also provide a seat for the hollow base end 27 of the strut 17.

In the preferred embodiment, the set of ring-shaped spacers 91a, 91b, 91c and 91d have heights (i.e., lengths) that vary according to a binary progression. Specifically, the spacer 91a has a height of one unit, the spacer 91b has a height of two units, the spacer 91c has a height of four units, and the spacer 91d has a height of eight units. This relationship enables the tubular support 29 to be secured in any one of 16 separate positions relative to the pipe 13, simply by selecting the particular spacers that are placed on the inward and outward sides of the threaded fitting 81. The set of spacers thereby enable the rotor 15 to be optimally positioned with its axis of rotation 23 aligned with the pipe centerline in 16 different sizes of pipes.

In the specific example depicted in FIG. 2, the rings 91b and 91c are positioned on the inward side of the threaded fitting 81, and the rings 91a and 91d are positioned on the outward side of the fitting. This positions the tubular support 29 at a site 6/15 of the way from its innermost position to its outermost position.

Several steps are followed to seal the flowmeter assembly 11 when it is secured to the pipe 13. First, a rubber gasket is placed between the pipe fitting 73 and the pipe, encircling the opening 19 in the pipe wall 21. Second, Teflon tape is placed on the threads of the pipe fitting and threaded fitting 81. Third, an O-ring 97 is placed within a circular recess formed on the inward side of the threaded fitting 81. These seals prevent the escape of any liquid flowing within the pipe.

It should be appreciated from the foregoing description that the present invention provides an improved insertion-type fluid flowmeter assembly for measuring the flow rate of a fluid flowing through a conduit. The assembly incorporates a strut-mounted rotor having just two blades, such that it can rotate through a circular area of diameter substantially larger than the maximum dimension of an opening in the conduit wall through which the strut extends. This minimizes the size of the opening, which simplifies its sealing. In addition, the support and strut are configured such that the strut is releasably secured to the support by a snap fit, to facilitate a convenient replacement of the strut and attached rotor as the need might arise. The flowmeter assembly further incorporates a special set of ring-shaped spacers, to facilitate a convenient adjustment of the distance by which the strut projects into the conduit.

Although the invention has been described with reference only to the presently preferred embodiment, those of ordinary skill in the art will appreciate that various modifications can be made without departing from the invention. Accordingly, the invention is defined only by the following claims.

We claim:

1. Flowmeter apparatus for monitoring fluid flow through a conduit, comprising:

a strut projecting into the conduit, through an opening in a wall of the conduit;

a rotor mounted on the strut, for rotation about an axis substantially parallel to the axis of fluid flow through the conduit, wherein such fluid flow causes the rotor to rotate at a rate that varies with flow rate; and a sensor located within the strut for sensing rotation of the rotor, to produce an indication of fluid flow;

wherein the rotor includes a hub and one or two blades projecting from the hub and oriented along a common axis;

and wherein rotation of the rotor causes the one or two blades to sweep through a circular area of diameter substantially larger than the maximum dimension of the opening in the wall of the conduit.

2. Flowmeter apparatus as defined in claim 1, wherein the rotor includes two blades, projecting in opposite directions from the hub.

3. Flowmeter apparatus as defined in claim 2, wherein:

the rotor further includes a permanent magnet carried at the remote tip of at least one of the two blades; and the sensor is carried by the strut, in a position adjacent to the tips of the rotor blades during a portion of their rotation, such that the rotor's rotation rate, and thus the fluid's flow rate, can be measured.

4. Flowmeter apparatus as defined in claim 1, and further comprising:

a support that supports the strut in its position extending into the conduit through the opening in the conduit; and a seal for sealing the opening to prevent fluid from escaping therethrough.

5. Flowmeter apparatus as defined in claim 4, wherein the support and the strut are configured such that the strut is releasably secured to the support by a snap fit.

6. Flowmeter apparatus as defined in claim 4, wherein the flowmeter apparatus is configured to facilitate an adjustment of the distance by which the strut projects into the conduit.

7. Flowmeter apparatus as defined in claim 6, wherein the flowmeter apparatus is configured to position the rotor such that the rotor rotates about an axis substantially coincident with the conduit's central longitudinal axis.

8. Flowmeter apparatus as defined in claim 6, wherein:

the support includes an outwardly projecting flange that defines a first ring-shaped surface, facing the opening in the wall of the conduit; and the flowmeter apparatus further includes a second ring-shaped surface secured to the conduit and facing the first ring-shaped surface, and a set of ring-shaped spacers sized to be selectively positioned between the first and second ring-shaped surfaces, to establish the distance by which the strut projects into the conduit.

9. Flowmeter apparatus as defined in claim 8, wherein the spacers of the set of ring-shaped spacers have relative heights that form a binary progression.

10. Flowmeter apparatus as defined in claim 1, and further comprising a bearing assembly that couples the hub of the rotor to the strut, the bearing assembly including one or more journal bearings and a face seal.

11. Flowmeter apparatus as defined in claim 10, wherein:

the bearing assembly further includes a bearing holder; and the hub of the rotor is secured to the bearing holder by a snap fit.

12. Flowmeter apparatus for monitoring fluid flow through a conduit, comprising:

a strut projecting into the conduit, through an opening in a wall of the conduit, the strut including a base end;

a support that supports the strut in its position projecting into the conduit through the opening in the conduit;

a rotor mounted on the strut, for rotation about an axis substantially aligned with the direction of fluid flow through the conduit, wherein such fluid flow causes the rotor to rotate at a rate that varies with flow rate; and a sensor located within the support for sensing rotation of the rotor, to produce an indication of fluid flow;

wherein the support and the base end of the strut, together, include a flexible finger and a recess configured to receive and retain the finger, for releasably securing the strut to the support by a snap fit.

13. Flowmeter apparatus as defined in claim 12, wherein:

the base end of the strut includes the flexible finger; and the support includes the recess configured to receive and retain the flexible finger of the strut, to releasably secure the strut to the support by a snap fit.

14. Flowmeter apparatus for monitoring fluid flow through a conduit, comprising:

a strut projecting into the conduit, through an opening in a wall of the conduit;

a support that supports the strut in its prescribed position, wherein the support includes a cylindrical external wall projecting into the conduit through the opening in the conduit, and wherein the support further includes a flange that projects outwardly from the cylindrical external wall, to define a first ring-shaped surface facing the opening;

a rotor mounted on the strut, for rotation about an axis substantially aligned with the direction of fluid flow through the conduit, wherein such fluid flow causes the rotor to rotate at a rate that varies with flow rate;

a sensor located within the support for sensing rotation of the rotor, to produce an indication of fluid flow;

wherein the support further includes a second ring-shaped surface secured to the conduit; and a set of ring-shaped spacers, each spacer having an opening sized and configured to slide individually over the support's cylindrical external wall, wherein the spacers are selectively positioned between the support's first and second ring-shaped surfaces, to establish the distance by which the strut projects into the conduit.

15. Flowmeter apparatus as defined in claim 14, wherein the spacers of the set of ring-shaped spacers have relative heights that form a binary progression.

* * * * *